Patented May 22, 1928.

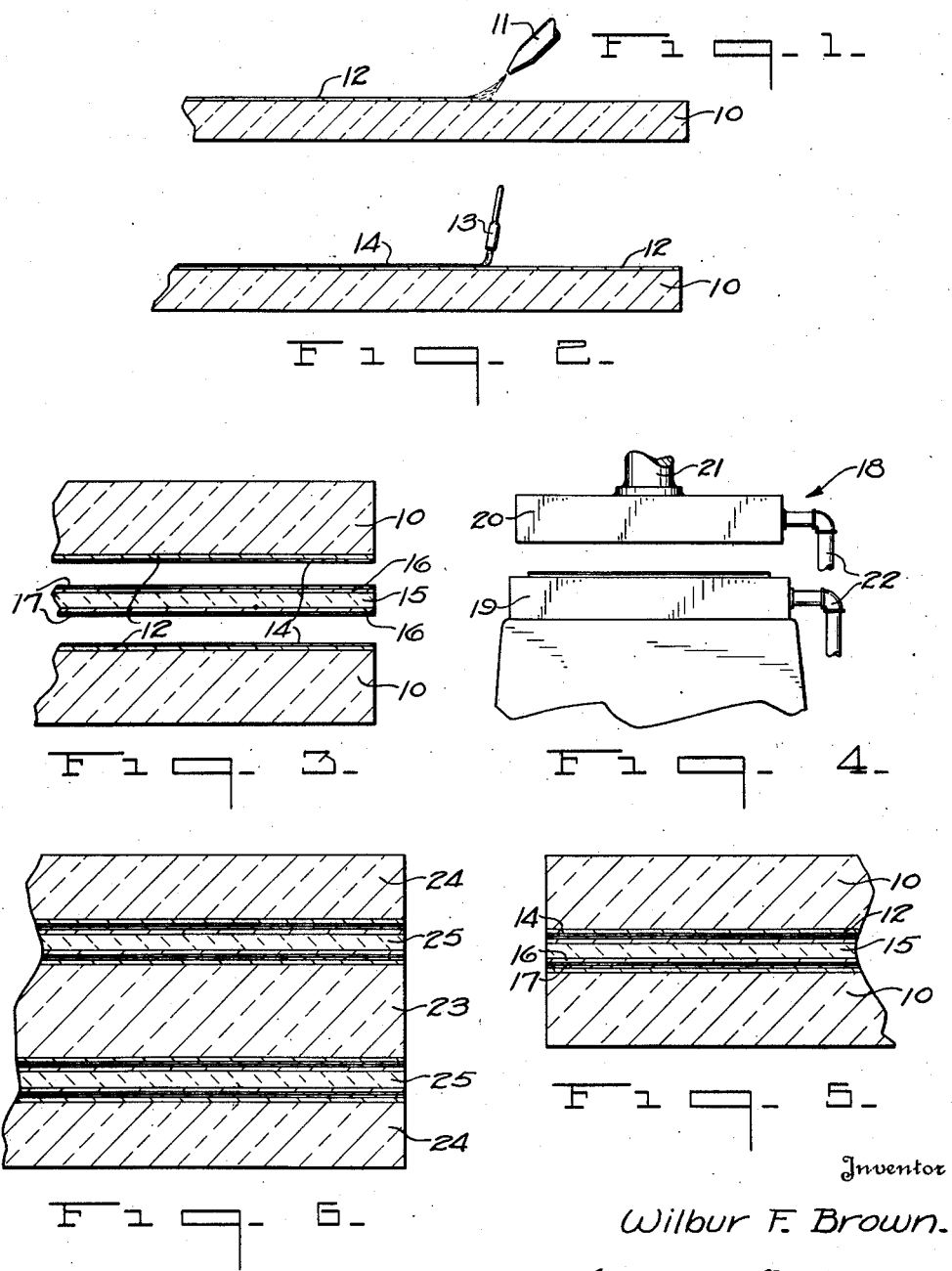

1,670,435

UNITED STATES PATENT OFFICE.

WILBUR F. BROWN, OF TOLEDO, OHIO, ASSIGNOR TO THE LIBBEY-OWENS SHEET GLASS COMPANY, OF TOLEDO, OHIO, A CORPORATION OF OHIO.

LAMINATED GLASS AND PROCESS OF PRODUCING THE SAME.

Application filed May 10, 1926. Serial No. 107,950.

The present invention relates to laminated glass.

An important object of the invention is to provide a process for producing, as a new article of manufacture, a sheet of laminated glass.

Another important object of the invention is to provide a process for producing laminated glass wherein an animal oil is used between a sheet of glass and a substantially non-brittle material to assist in uniting the same.

Another object of the invention is to provide a process for producing laminated glass wherein one side each of two sheets of glass has formed thereon a skin of cellulose composition material, the skins preferably being permitted to dry, after which they are coated with a film of preferably non-solvent animal oil, then interposing a sheet of non-brittle material between the coated surfaces of the two sheets of glass, and then uniting the three sheets.

Still another object of the invention is to form a sheet of laminated glass by spraying or otherwise producing a skin of cellulose composition material upon one side of two sheets of glass, then applying to the skins a film of animal oil, then coating both sides of a non-brittle sheet of material with a film of animal oil, interposing the non-brittle sheet between the sheets of glass, and uniting the same.

Other objects and advantages of the invention will become apparent during the course of the following description.

In the drawings wherein like numerals are employed to designate like parts throughout the same:

Fig. 1 is a view illustrating diagrammatically the formation of a skin on a sheet of glass, Fig. 2 is a similar view showing diagrammatically coating the skin, formed in Fig. 1, with a film of animal oil, Fig. 3 is a fragmentary sectional view illustrating the laminations before they are united, Fig. 4 represents diagrammatically a form of press which may be used to unite the laminations, Fig. 5 is a fragmentary sectional view of the finished product, and Fig. 6 is a similar view of a slightly modified form of product.

In accordance with the present invention, in Fig. 1, the numeral 10 designates a sheet of glass. The sheet of glass has sprayed or otherwise deposited thereon, by means of the spray or the like 11, a coating of preferably cellulose composition material 12, which forms a skin on the sheet of glass. After the sheet of glass has been coated with a skin, it is preferably permitted to dry so that all of the solvents contained in the solution will evaporate off, leaving a substantially dry skin of cellulose material.

The next step in the process is illustrated in Fig. 2, where the sheet of glass 10, having the skin 12, is being coated, by means of a brush or the like, with a film of liquid such as animal oil 14. The animal oil 14 is preferably non-solvent, or substantially non-solvent.

In Fig. 3 is shown a sheet 15 which is preferably a cellulose composition material sheet, and which is substantially non-brittle. The sheet 15 may or may not be sprayed to form a skin 16 on both sides thereof. After the skins 16 have been formed on the sheet 15, they are given a coating of animal oil 17, such as that which is applied in Fig. 2.

Fig. 3 shows the three laminations, namely, the two sheets of glass 10 and the sheet of non-brittle material 15, in position to be united, the three laminations each having the skins thereon and films of non-solvent animal oil.

The laminations may then be placed in a press designated in its entirety by the numeral 18, comprising preferably a lower platen 19 and an upper platen 20, operable by means of the movable plunger 21. Connections 22 may be provided to permit a circulation of steam or other liquid, at preferably a high temperature, through the platens, so that the laminations may be united under the action of heat and pressure. It has been found that the non-solvent animal oil, applied to the laminations as above described, will assist considerably in obtaining an excellent and permanent union between the various laminations. At the same time the animal oil will almost become entirely expelled from between the laminations so that a negligible amount of liquid remains between the laminations in the finished product. The form of press used is such that the pressure is preferably initially applied centrally of the laminations and gradually extending toward the outer extremities so that the animal oil will have an opportunity of becoming expelled.

Fig. 5 designates the finished sheet. It is to be understood that the drawings are purely diagrammatic, as the skins formed on the sheets of glass and the sheets of non-brittle material are relatively very thin, while the film of animal oil could not be seen in the sectional view such as Fig. 5, if drawn to scale.

In Fig. 6 is illustrated a sheet of so-called bullet-proof glass formed in accordance with the present process, and comprises a central sheet 23, two outer sheets 24, two non-brittle sheets of material 25, and the various skins and coatings of animal oil.

Although the process has been described as including coating both the sheets of glass and the non-brittle sheets with a skin, it is to be understood that the invention also contemplates that process wherein the sheets of glass have the skins formed thereon, while the non-brittle sheets need not be treated in the same manner. In speaking of the animal oil as preferably non-solvent, the term non-solvent is used to differentiate from a liquid which has a noticeable solvent action on the materials used in the manufacture of laminated glass.

As examples of animal oils which may be used, the following are mentioned: Marine animal oils, such as fish oils, liver oils, and blubber oils; oils from terrestrial animals, such as neat's-foot. The present invention, therefore, embraces the use of any of the animal oils for forming a film between laminations to assist in obtaining a permanent union between the same.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. As a new article of manufacture, a sheet of laminated glass including a sheet of glass having a skin of cellulose material thereon which has been coated with a film of animal oil.

2. As a new article of manufacture, a sheet of laminated glass including a sheet of glass having a skin of cellulose material thereon which has been coated with a film of non-solvent animal oil.

3. As a new article of manufacture, a sheet of laminated glass comprising a plurality of laminations united by an animal oil binder.

4. As a new article of manufacture, a sheet of laminated glass comprising a plurality of laminations united by a non-solvent animal oil binder.

Signed at Toledo, in the county of Lucas, and State of Ohio, this 6th day of May, 1926.

WILBUR F. BROWN.